United States Patent
Paczkowski et al.

(10) Patent No.: US 8,918,087 B1
(45) Date of Patent: Dec. 23, 2014

(54) METHODS AND SYSTEMS FOR ACCESSING CROWD SOURCED LANDSCAPE IMAGES

(75) Inventors: Lyle W. Paczkowski, Mission Hills, KS (US); Arun Rajagopal, Leawood, KS (US); Matthew Carl Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 9 days.

(21) Appl. No.: 13/491,595

(22) Filed: Jun. 8, 2012

(51) Int. Cl.
*H04M 3/493* (2006.01)

(52) U.S. Cl.
USPC ............... 455/414.2; 455/457; 455/456.3; 455/561; 345/419; 345/633

(58) Field of Classification Search
CPC ....... H04W 4/02; H04W 4/021; H04W 4/023; H04M 1/72572; H04M 3/42348; G06T 1/00; G06T 3/0425; G06T 3/0484; G06T 3/1415; G06T 17/30047
See application file for complete search history.

(56) References Cited

U.S. PATENT DOCUMENTS

| | | | | |
|---|---|---|---|---|
| 6,101,381 A * | 8/2000 | Tajima et al. | ............... | 455/414.2 |
| 8,803,916 B1 | 8/2014 | Paczkowski et al. | | |
| 2007/0025723 A1 * | 2/2007 | Baudisch et al. | ............. | 396/287 |
| 2009/0021514 A1 * | 1/2009 | Klusza | ........................... | 345/419 |
| 2009/0210932 A1 | 8/2009 | Balakrishnan et al. | | |
| 2011/0052083 A1 * | 3/2011 | Rekimoto | ..................... | 382/218 |
| 2011/0157306 A1 | 6/2011 | Lin et al. | | |
| 2011/0279445 A1 * | 11/2011 | Murphy et al. | ............... | 345/419 |
| 2011/0279453 A1 * | 11/2011 | Murphy et al. | ............... | 345/420 |
| 2011/0313953 A1 | 12/2011 | Lane et al. | | |
| 2012/0033032 A1 * | 2/2012 | Kankainen | ....................... | 348/36 |
| 2012/0105476 A1 * | 5/2012 | Tseng | ............................ | 345/633 |
| 2012/0242798 A1 | 9/2012 | Mcardle et al. | | |
| 2012/0311130 A1 | 12/2012 | Zadig et al. | | |
| 2013/0016176 A1 | 1/2013 | Hines et al. | | |
| 2013/0124326 A1 | 5/2013 | Huang et al. | | |
| 2013/0162676 A1 | 6/2013 | Taylor | | |
| 2013/0187953 A1 | 7/2013 | Matsumura et al. | | |
| 2013/0249948 A1 | 9/2013 | Reitan | | |

OTHER PUBLICATIONS

Lyle W. Paczkowski, et al., Patent Application entitled "Methods and Systems for Accessing Crowed Sourced Landscape Images," filed Jun. 8, 2012, U.S. Appl. No. 13/491,595.
FAIPP Pre-Interview Communication dated Jan. 7, 2014, U.S. Appl. No. 13/463,756, filed May 3, 2012.
Notice of Allowance dated Mar. 24, 2014, U.S. Appl. No. 13/463,756, filed May 3, 2012.

* cited by examiner

*Primary Examiner* — Rafael Pérez-Gutiérrez
*Assistant Examiner* — Keith Fang

(57) ABSTRACT

A method. The method comprises maintaining a regional data store of landscape models for each of a plurality of base stations, wherein each regional data store is proximate to its corresponding base station and wherein each landscape model is derived from a plurality of images of a landscape located proximate to the base station. The method further comprises receiving a request for a landscape image from a mobile access terminal in the serving area of a first base station, wherein the first base station is one of the plurality of base stations and wherein the request for the landscape image identifies a landscape model maintained by the first base station. The method further comprises transmitting the landscape image to the mobile access terminal by the first base station, wherein the landscape image is created based on the landscape model identified in the request.

19 Claims, 9 Drawing Sheets

METHODS AND SYSTEMS FOR ACCESSING CROWD SOURCED LANDSCAPE IMAGES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Augmented reality (AR) refers to a direct or indirect view of the physical, real-world environment whose elements (e.g., sound, graphics) are augmented based on computer-generated input (e.g., accelerometer, GPS data, textual data). In this manner, AR enhances one's current perception of reality. By contrast, virtual reality replaces the real world with a simulated one.

AR is may be performed as an application being executed on a portable device to display information in context with environmental elements. For example, an AR application running on a portable device may be used in a golf context to show distances to a fairway or green in text. For example, the portable device, such as a mobile phone, may take a picture of a portion of a golf course, possibly including a putting green and a flag positioned in the hole. The AR application may analyze the picture, determine a distance to the flag, and superimpose a textual message such as "90 yards to flag" over the picture presented on a display of the portable device. Further, an AR application running on a portable device may be used in an outdoor context to show compass parameters, position information, or points of interest relative to the physical environment in which one resides. Further, an AR application running on a portable device may be used in a gaming context, in which objects in the physical environment in which one resides becomes part of a game experience. With AR, computer-generated graphics (e.g., words and/or lines) are often overlaid onto the real-world view provided by a camera view of a portable device.

Implementation of AR may be computationally intensive, and thus device resources (e.g., processor cycles and memory) may be overwhelmed during AR operations. In such case, use of AR negatively affects other applications or operations of a portable device. Further, the computationally-intensive aspect of AR means it may be limited to the highest cost/performance chipsets and devices.

SUMMARY

In an embodiment, a method is disclosed. The method comprises maintaining a regional data store of landscape models for each of a plurality of base stations, wherein each regional data store is proximate to its corresponding base station and wherein each landscape model is derived from a plurality of images of a landscape located proximate to the base station. The method further comprises receiving a request for a landscape image from a mobile access terminal in the serving area of a first base station, wherein the first base station is one of the plurality of base stations and wherein the request for the landscape image identifies a landscape model maintained by the first base station. The method further comprises transmitting the landscape image to the mobile access terminal by the first base station, wherein the landscape image is created based on the landscape model identified in the request.

In some embodiments, a system is provided. The system comprises a plurality of base stations. The system also comprises a plurality of regional data stores, wherein each regional data store is associated with a distinct one of the plurality of base stations and wherein each regional data store comprises landscape images corresponding to a coverage area of its associated base station. With the system, an augmented reality request for a mobile access terminal is received by one of the plurality of base stations, which is nearest to the mobile access terminal. With the system, at least one landscape image of the regional database for the nearest base station is used to build augmented reality content corresponding to the augmented reality request.

In some embodiments, a base station is provided. The base station comprises a processor and a non-transitory computer-readable medium in communication with the processor. The non-transitory computer-readable medium stores augmented reality servicing instructions that, when executed, cause the processor to receive an augmented reality request from a mobile access terminal. The augmented reality servicing instructions, when executed, further cause the processor to identify one of a plurality of landscape images corresponding to the augmented reality request and accessible to the base station. The augmented reality servicing instructions, when executed, further cause the processor to stream augmented reality content corresponding to the augmented reality request based on the identified landscape image.

In some embodiments, a method is provided. The method comprises maintaining a regional data store of landscape images for each of a plurality of base stations. The method also comprises receiving an augmented reality request from a mobile access terminal by one of the plurality of base stations. The method also comprises providing augmented reality content for playback by the mobile access terminal associated with the augmented reality request based on at least one landscape image from the regional data store of the base station that received the augmented reality request.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
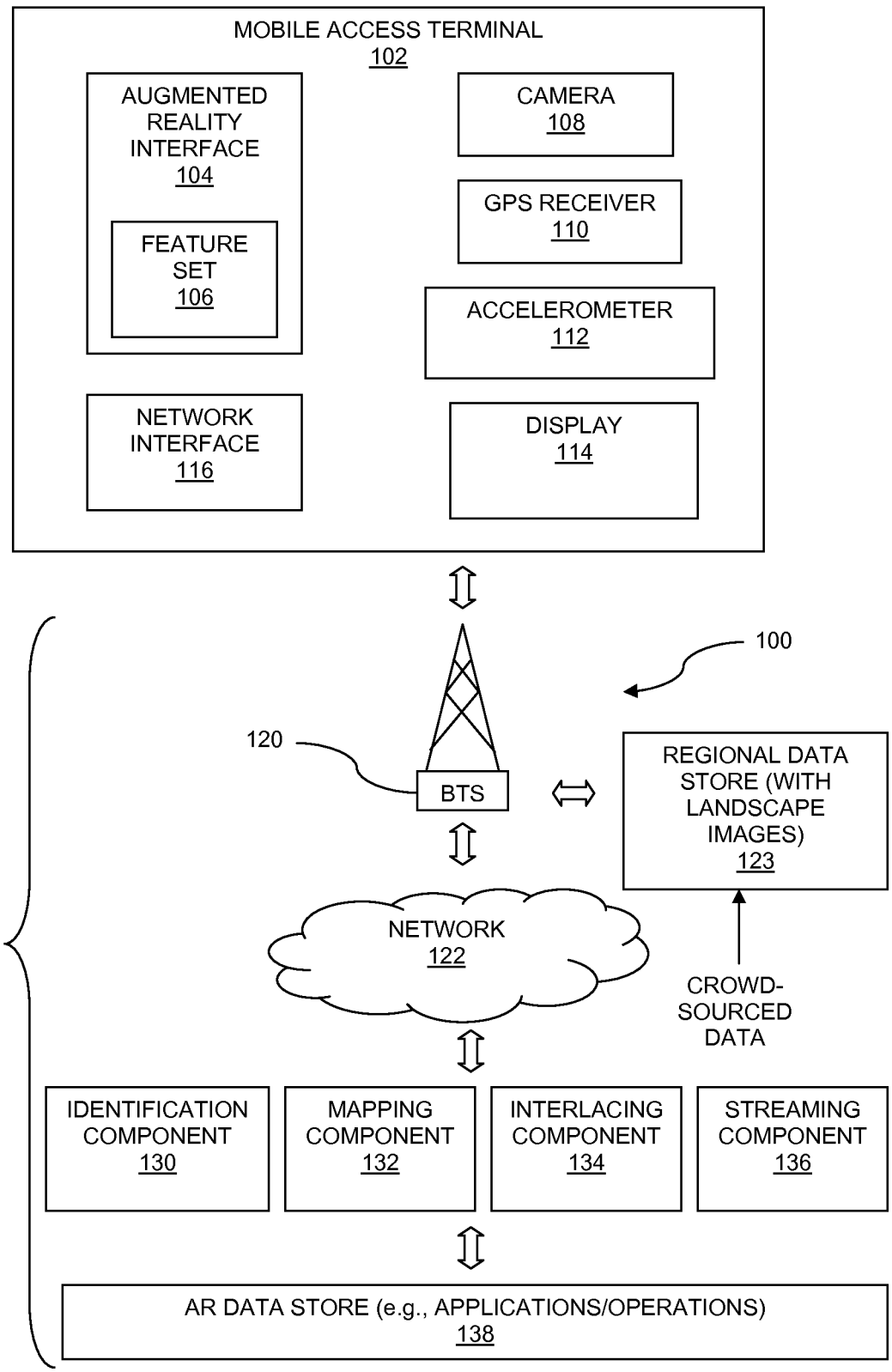
FIGS. 1A and 1B illustrate a system in accordance with embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Augmented reality (AR) applications are often specific to a particular use (e.g., a golf application, a compass application, or a gaming application) and are separately installed on a device. Further, each AR application may not be compatible with the various types of portable devices that are available to customers. Further, AR mapping/location framing is often limited to identifiable manmade objects, because identifying changing landscapes may be difficult and/or more computationally-intensive. In part, the difficulty is due to changes in rural or changing landscapes throughout a year or throughout a season. For example, it may be challenging to develop computer programming that identifies a location decorated with Christmas decorations in December as being substantially the same location as seen in July; that identifies a location having an ice skating rink in January as being substantially the same location as seen in July as a pond; that identifies a landscape with brilliant fall colors as the same location as seen in March with no colorful leaves. These issues prevent the widespread deployment of AR technology on portable consumer devices.

The present disclosure teaches a system for gathering images of landscapes at a base station, storing the images in a local or regional data store maintained by the base station, and analyzing the images to identify sub-sets of the images that are associated to the same landscape. For example, a first sub-set of images may be associated with a dominating mountain, a second sub-set of images may be associated with a meadow having a waterfall at one end of the meadow, a third sub-set of images may be associated with an open plain with a river snaking through the foreground. Each sub-set of images may be analyzed to develop a kind of composite of the images and/or a model of the landscape feature that is the subject of the images. The sub-set of images may be analyzed to produce a three dimensional view of the landscape feature, for example a two dimensional view of the subject landscape feature from any perspective in a circle around the landscape feature. In an embodiment, the sub-set of images may be analyzed to produce a four dimensional view of the landscape feature, for example the three dimensional view described as viewed at different times of day and/or as viewed at different seasons of the year and/or as viewed under different weather conditions.

The images may be provided to a base station by mobile access terminals, for example mobile phones having cameras, that have taken the images while in the coverage area of the base station of a landscape feature that is proximate to the base station. The images may be provided by virtue of the mobile access terminal sending the image embedded in a message directed to a family member or a colleague via the base station. The user of the mobile access terminal may have provided permission to the operator of the base station, for example a wireless service provider, to make a copy of any images that the mobile access terminal transmits via a base station operated by service provider for the purpose of contributing to composing landscape models.

Storing and processing the images at the base station may consume less network bandwidth than a centralized landscape modeling solution, in that the images may already be passing through the subject base station in any case. Additionally, because the images are presumed to be taken proximate to the base station, an inherent sorting of images occurs that makes the analysis of images and the allocation of images to sub-sets based on association to local landscape features easier. For example, a base station maintaining sub-sets of images related to the Grand Teton mountain does not have to handle images associated with the Grand Canyon; a base station maintaining sub-sets of images related to the Grand Canyon does not have to handle images associated with the Grand Teton mountain.

A user taking a picture of a landscape feature with a mobile access terminal may send the picture from the mobile access terminal to the base station and request information about the landscape feature, such as what is the name of the landscape feature? What are some of the physical characteristics of the landscape feature? What does the landscape feature look like at a different time of day, in a different season, in different weather conditions, from a different perspective? The base station may analyze the picture or image to match it to one or more landscape models that the base station maintains. When the base station identifies a landscape model matching the picture sent in the request, appropriate information is accessed and transmitted to the mobile access terminal. Alternatively, the base station identifies the landscape model, extracts an image of the landscape from the landscape model that corresponds with the requested image parameter (time of day, season of year, perspective), and sends the image to the mobile access terminal. In an embodiment, the base station may provide the GPS coordinates of the base station to the mobile access terminal for storing with the picture and/or image.

Some base stations may share images or landscape model data, for example when the base stations may be proximate to the same landscape features. For example, given the scale of the Grand Teton, it can be said that a plurality of base stations are proximate to the Grand Teton, in the sense that images of the Grand Teton may be transmitted from mobile access terminals in the coverage areas of multiple base stations. As an alternative embodiment, some or all of the image storing, landscape model generation, and landscape model information requests may be handled by a central data store.

While the description above has referred to landscapes, it is understood that the teachings herein are applicable to other objects besides landscape features. For example, a similar data store of images of trees may be created and sorted into sub-sets, where each sub-set of tree images is associated with a particular tree, for example an Engleman Spruce tree.

Some embodiments of the disclosure are directed to a network-based augmented reality (AR) service delivery platform having regional data stores with indexed landscape images to expedite providing a response to an augmented reality request. The AR service delivery platform is compatible with different types of mobile access terminals having different capabilities. With the AR service delivery platform, at least some operations to prepare AR content are performed by a network, and then the AR content is delivered to an AR interface being executed by a mobile access terminal for playback. The AR interface enables various types of AR requests and the presentation of corresponding AR content without requiring a user to actively interact with multiple AR applications. In other words, the AR interface either supports all available AR content provided by the AR service delivery platform or acts as an intermediary to access AR applications supported by the AR service delivery platform. In this manner, at least some of the computational burden of preparing AR content can be separated from mobile access terminals, and the management of AR presentations on a mobile access terminal is facilitated.

In at least some embodiments, all AR manipulations are performed by the AR service delivery platform, and then AR content is streamed to each mobile access terminal for playback. Alternatively, in other embodiments, AR manipulations may be performed by an AR application executing at the base station and with reference to the local data store associated with the base station, where the AR manipulations are performed substantially decoupled from other base stations and other computing servers remote from the base station. To support AR operations, mobile access terminals may provide some information to the AR service delivery platform in the form of an AR request. For example, a mobile access terminal may send an AR request to the AR service delivery platform, where the AR request includes information such as a picture frame (or frames), global positioning system (GPS) data, and accelerometer data. In response, the AR service delivery platform performs various operations to build the AR content to be streamed to the mobile access terminal that sent the AR request. As disclosed herein the AR service delivery platform may maintain a regional data store of crowd-sourced landscape images for each of a plurality of base stations, receive an augmented reality request for a mobile access terminal via one of the plurality of base stations (e.g., the base station that is nearest to the mobile access terminal), and provide a response to the augmented reality request using the crowd-sourced landscape images of the regional data store for the nearest base station. Alternatively, in an embodiment, the crowd-sourced landscape images may be stored in a centralized location, where the landscape images may be stored with metadata that identifies the base station that is closest to the subject landscape images. As used herein, the term "crowd-sourced" images such as landscape images refers to submissions of images or videos from the general public over time.

The images or videos may be recorded (i.e., snapped or taken) and transmitted from the same types of portable devices that are available to consumers for viewing AR content. As an example, when an end-user records an image or video on their portable device, an AR interface application may inquire whether the image or video can be used as part of a crowd-sourced data store for the AR service delivery platform. Additionally or alternatively, the user may have previously opted to submit certain types of images or videos for the crowd-sourced data store. In some embodiments, an end-user that submits images or videos for the crowd-sourced data store may receive some type of compensation such as money, coupons, reduced costs for use of the AR service delivery platform, and/or upgraded features for the AR service delivery platform. In accordance with some embodiments, the AR service delivery platform operations may involve overlaying crowd-sourced content with information as described herein. Additionally or alternatively, the AR service delivery platform may identify and report information related to crowd-sourced content without image overlay typical of AR (another mechanism for presenting information such as email, text, SMS, may be used).

As an example, an end-user on vacation may photograph the Grand Teton mountain with a smartphone. The photograph is subsequently submitted as part of a Multimedia Messaging Service (MMS) message to a data store related to AR services. The photograph and/or MMS message may include metadata such as geographic location information, time/date information, compass heading information, and accelerometer information. Over time, many such photographs or videos could be collected from end-users (e.g., tourists) at different geographic locations, different times of day/year, and/or different angles.

The amount of crowd-sourced data that could be stored by the regional data stores is potentially unlimited. In order to organize crowd-sourced images or videos, some effort may be made to promote submissions of images or videos based on time criteria, geography criteria, or perspective criteria. These same criteria may be used for indexing crowd-sourced images. For example, in at least some embodiments, the landscape images for each regional data store is indexed using time-based indexing (identifying time of day, a calendar date, or a season), geography-based indexing (identifying a geographic location where a camera still or video is shot) and/or perspective-based indexing (identifying a direction/angle for a camera still or video).

In accordance with at least some embodiments, the AR service delivery platform improves presentation of AR content on mobile access terminals with limited performance capabilities since the mobile access terminal only needs to render streaming AR content provided by the AR service delivery platform. This allows lower-end devices with lesser chipsets to provide AR experiences and thus the availability and monetization of AR is broadened across many types of mobile access terminals.

Figure 1B:
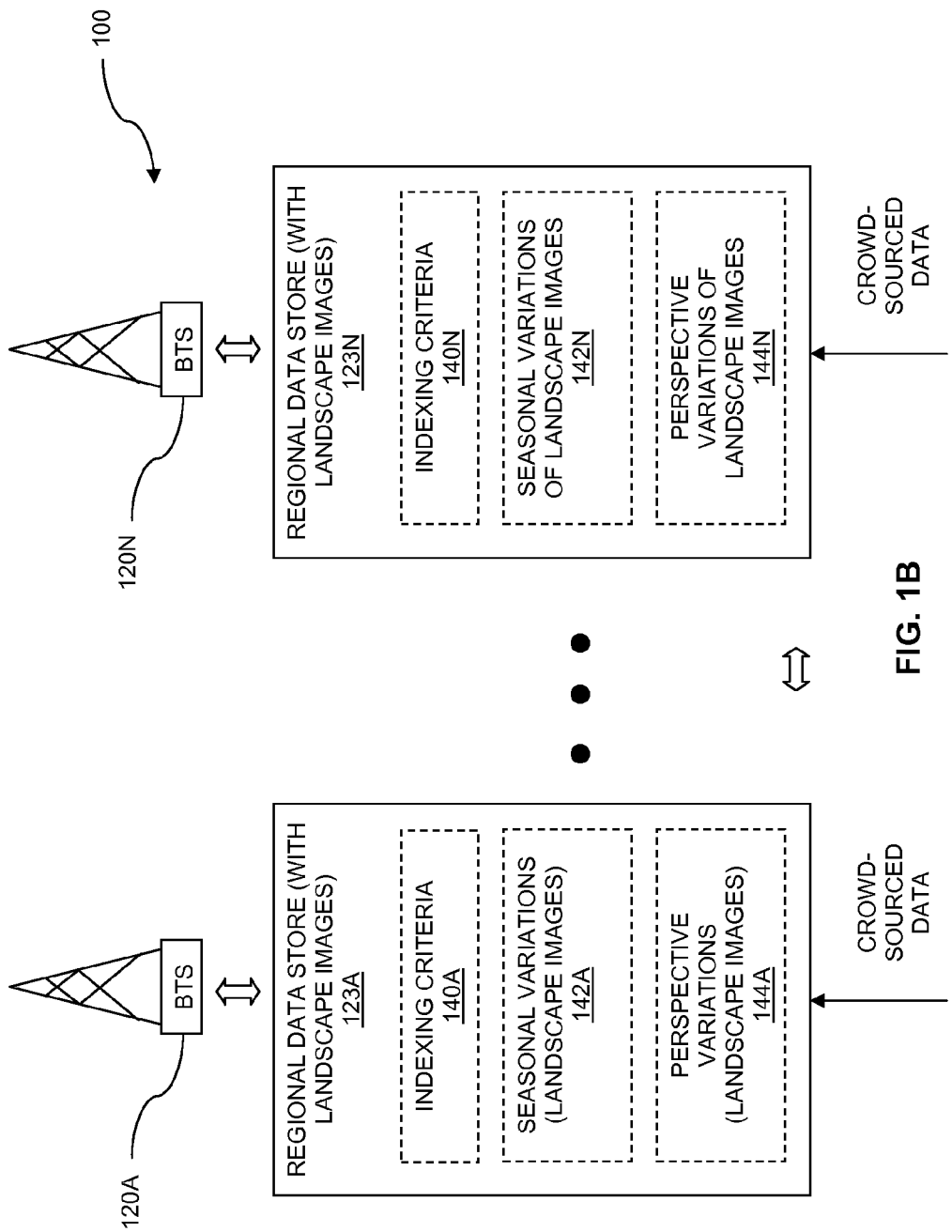

FIGS. 1A and 1B illustrate a system 100 in accordance with embodiments of the disclosure. As shown in FIG. 1A, the system 100 comprises a mobile access terminal 102 in communication with an AR service delivery platform 121 via a base station (BTS) 120. The mobile access terminal 102 represents, for example, a cellular phone, a smart phone, a personal digital assistant (PDA), a tablet computer, or another mobile device. In FIG. 1A, the mobile access terminal 102 is shown to comprise an AR interface 104 configured to present AR content received from the AR service delivery platform 121. The AR interface 104 comprises a feature set 106 that defines the types of AR content that can be presented.

The feature set 106 may vary for different mobile access terminals 102 and/or may vary over time for a particular mobile access terminal 102. For example, the feature set 106 may correspond to sensor compatibilities, screen resolution, network speed, and/or rendering capabilities of the mobile access terminal 102. In other words, the feature set 106 of the AR interface 104 is based on the performance characteristics of other components of the mobile access terminal 102 such as camera 108, GPS receiver 110, accelerometer 112, display 112, and network interface 116. Other features of the mobile access terminal 102 that may be considered with the feature set 106 include a microphone, a speaker, and software applications that reside on the mobile access terminal 102. The scope of the feature set 106 can be enhanced to include any feature that is either resident on the mobile access terminal 102 or can be provided to the end-user through a wireless peripheral (e.g., a Bluetooth peripheral) or a wired peripheral that can be attached to the mobile access terminal 102.

In accordance with embodiments, the camera 108 operates to record video and/or still photographs using an electronic image sensor. The GPS receiver 110 provides location and time information based on GPS satellites. In alternative embodiments, another satellite-enabled self-location function is used instead of GPS. The accelerometer 112 is a sensor-based tool to measure mobile access terminal parameters such as acceleration, movement, and orientation. The display 114 corresponds to a liquid crystal display (LCD) screen or other display technology. The display 114 may be a touch screen in some embodiments. Further, the resolution and color scheme of the display 114 may vary for different mobile access terminals 102. The network interface 116 corresponds to one or more wireless technology communication modules to enable the mobile access terminal 102 to transmit information to or receive information from BTS 120.

As an example, the mobile access terminal 102 may transmit an AR request to the BTS 120 using the AR interface 104. The AR interface 104 may generate AR requests upon request from a user. Additionally or alternatively, the AR interface 104 may generate AR requests using predetermined settings of the AR interface 104. The predetermined settings may be determined based on a selection of available settings by a user, a selection of AR interests by a user, a geographic location of the mobile access terminal 102, or user profile information that identifies user interests.

Upon reception of an AR request, the BTS 120 accesses a regional data store 123 with landscape images as part of the AR service delivery platform 121 to build AR content corresponding to the AR request. In FIG. 1A, the operations of the AR service delivery platform 121 are performed over a network 122 by an identification component 130, a mapping component 132, an interlacing component 134, and a streaming component 136. In some embodiments, each of the components 130, 132, 134, 136 corresponds to a separate computing/memory resource (e.g., a server). In such case, each of the components 130, 132, 134, 136 may be optimized to perform their particular function. Alternatively, the components 130, 132, 134, 136 may be hardware components or software components of a single server. In either case, the components 130, 132, 134, 136 may have access to at least one AR data store 138 that supports AR operations. In some embodiments, one or more of the components 130, 132, 134, 136 correspond to BTS components. For example, the identifying component 130 and/or the mapping component 132 may be part of the BTS 120 and may access the regional data store 123 with landscape images during the process of building AR content for delivery to the mobile access terminal 102.

The regional data store 123 may be part of the BTS 120 or may be accessible via the network 122 or an Internet connection. In other words, the location of the regional data store 123 may vary, provided the regional data store 123 is indexed or uniquely identified by its related BTS 120 and can provide information back to the mobile access terminal within predetermined latency thresholds. Further, the mobile access terminal 102 may communicate with the network 122 or Internet for AR service delivery platform operations without involvement the BTS 120 (e.g., based on a WiFi connection).

In at least some embodiments, the identification component 130 is configured to receive an augmented reality request from a mobile access terminal 102, to identify a context for the augmented reality request, and to identify the feature set 106 supported by the mobile access terminal 102 associated with the augmented reality request. The mapping component 132 is configured to map the identified feature set 106 and the context to a subset of available augmented reality applications or operations. The context may be determined, for example, from information (a dataset) provided with the AR request such as camera stills/video, GPS data, and/or accelerometer data. When the mobile access terminal 102 is in a rural landscape or changing urban area, the operations of the identifying component 130 and/or the mapping components 132 are facilitated by access to the regional data store 123 (with rural or changing landscape images) as described herein. Alternatively, when the mobile access terminal 102 is in a non-rural area (i.e., with man-made objects), the operations of the identifying component 130 and/or the mapping components 132 may be facilitated by access to the regional data store 123, which may store non-rural images in addition to the rural landscape images. Images, applications, or operations that are not in the regional data store 123 may be stored in the AR data store 138.

The interlacing component 134 is configured to execute the subset of available augmented reality applications and to generate augmented reality content corresponding to the augmented reality request. The streaming component is configured to stream the augmented reality content to the mobile access terminal 102 associated with the augmented reality request for playback. As an example, if the AR request comprises a camera image, the AR content provided by the AR service delivery platform 121 for playback may comprise the camera image (or an image regional data store 123 of landscape images) interlaced with AR image content such as words, lines, identifiers, gaming graphics, or other AR content. Similarly, if the AR request comprises a camera video, the AR content provided by the AR service delivery platform 121 for playback may comprise the camera video (or a video from the regional data store of landscape images 123) interlaced with AR image content such as words, lines, identifiers, gaming graphics, or other AR content. Audible sounds also may be included with AR content for playback by a mobile access terminal 102.

In at least some embodiments, the AR service delivery platform 121 is configured to provide AR content in response to an AR request in accordance with a predefined AR latency threshold. The predefined AR latency threshold balances the costs of providing AR content with the AR service delivery platform 121 while maintaining a suitable streaming speed for AR content that promotes widespread and ongoing use of AR by mobile access terminals 102. For example, the design and operation of the identification component 130, the mapping component 132, the interlacing component 134, and the streaming component 136 may be based on the predefined AR latency threshold. The predefined AR latency threshold may be determined based on experiments or estimates to determine a suitable latency that does not negatively affect the interaction of a user with AR content. Without limitation to other embodiments, the predefined AR latency threshold may be between about 0.1 second and about 0.5 second (i.e., 2 to 10 AR content frames per second). In another embodiment, the predefined AR latency threshold may be between about 0.5 second to about 5 seconds. In another embodiment, the predefined AR latency threshold may be between about 5 seconds and about 1 minute. In some embodiments, the predefined AR latency threshold varies for different quality of service (QoS) tiers applied to different devices, different user accounts, or different groups (premium tier, business tier, or economy tier).

In some embodiments, the predefined AR latency threshold is achieved for the AR service delivery platform 121 due to hardware of the interlacing component 134 being optimized to interlace images/video with augmented reality content. Additionally or alternatively, the predefined AR latency threshold is achieved for the AR service delivery platform 121 due to a synchronization protocol implemented by at least one of the identification component 130, the mapping component 132, the interlacing component 134, and the streaming component 136 to expedite alignment of the augmented reality request with the augmented reality content. Additionally or alternatively, the predefined AR latency threshold is achieved for the AR service delivery platform 121 based on localized caching used by the identification component 130 to expedite identifying the context for the augmented reality request and the feature set 106 supported by the mobile access terminal 102 associated with the augmented reality request.

A local cache may be stored, for example, by the BTS 120 or a high-speed data store nearby the BTS 120. In some embodiments, the regional data store 123 corresponds to the local cache and stores images used by the identification component 130. More specifically, the identification component 130 may compare a picture frame included with the augmented reality request to the images in the regional data store 123 to expedite identifying the context for the augmented reality request. Because changing landscape images are difficult to compare to images created of the same location under different conditions, compared to man-made objects, the regional data store 123 may use time-based indexing, geography-based indexing and/or perspective-based indexing to compare landscape images.

Time-based indexing may identify a landscape image in the regional data store 123 according to a date (month and day) or season associated with the landscape image. Additionally or alternatively, time-based indexing may also identify a landscape image according to a morning, mid-day, evening, or night designation associated with a landscape image. Geography-based indexing may identify a landscape image in the regional data store 123 according to a geographic location associated with a landscape image in the regional data store 123. Perspective-based indexing may identify a landscape image in the regional data store 123 according to a direction or angle associated with a landscape image in the regional data store 123. The regional data store 123 may likewise store other AR applications/operations used to build and stream AR content to the mobile access terminal 102 in response to an AR request.

In FIG. 1B, a plurality of BTSs 120A-120N are shown for the system 100, where the BTSs 120A-120N correspond to different geographic regions (e.g., corresponding to a BTS wireless service coverage area or other placement criteria). As shown, each of the BTSs 120A-120N comprises a corresponding regional data store 123A-123N with indexing criteria 140A-140N, seasonal variations 142A-142N of the landscape images, and perspective variations 144A-144N of the landscape images. In some embodiments, the regional data stores 123A-123N also may comprise man-made object images to facilitate AR service delivery platform operations for mobile access terminals 102 that are in city or urban geographic locations. However, man-made objects are usually easier to identify and may not need to be indexed in the manner described herein for landscape images. As shown, each of the regional data stores 123 may be updated using crowd-sourced data as described herein. The amount of crowd-sourced data that could be stored by the regional data stores 123A-123N is potentially unlimited. Accordingly, some effort may be made to promote submissions of images or videos based on time criteria, geography criteria, or perspective criteria (i.e., the same types of criteria used for indexing). Further, redundant images or videos may be deleted from the regional data stores 123A-123N as needed.

Figure 2:
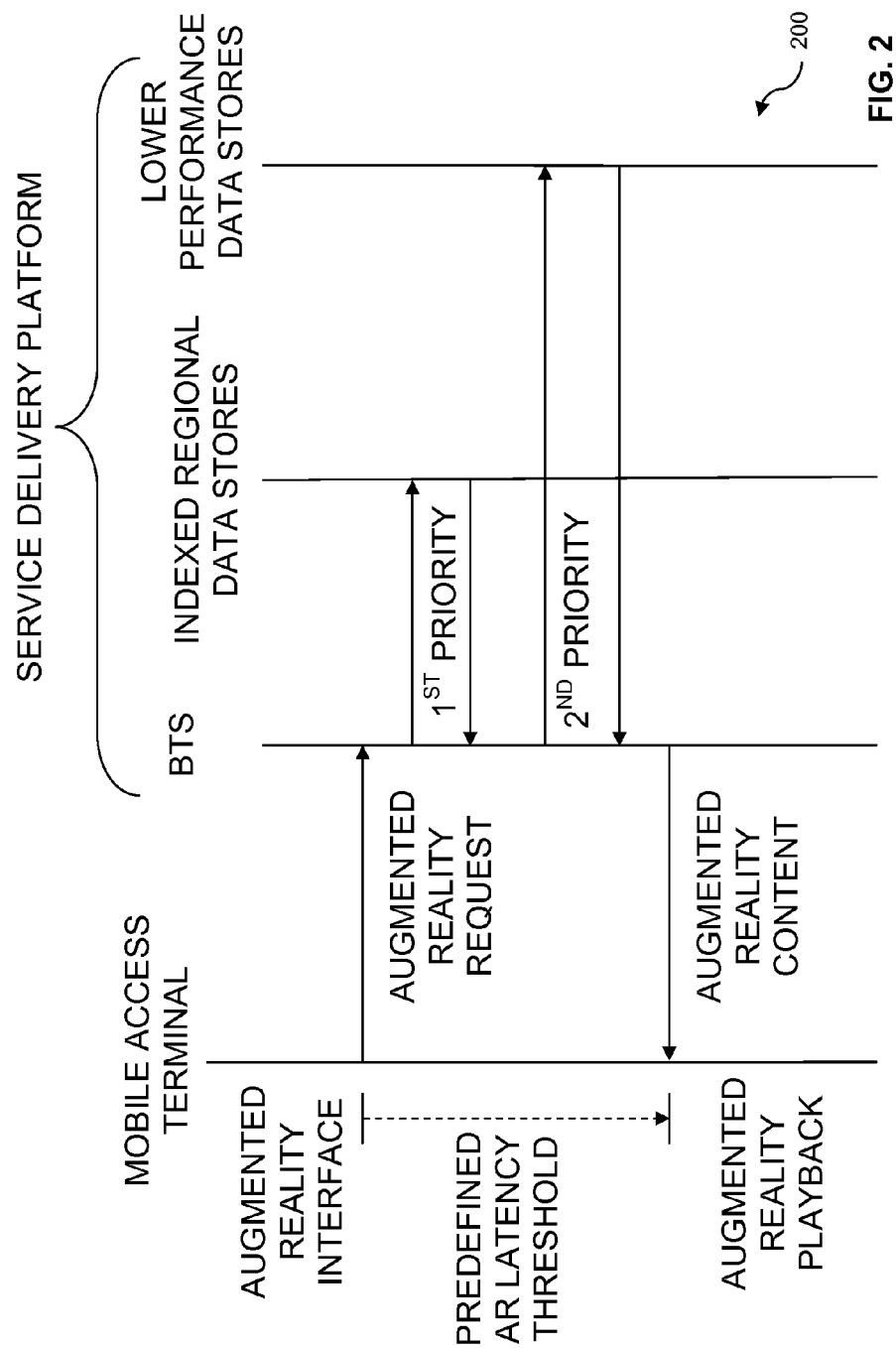
FIG. 2 illustrates a chart showing operations of the system of FIG. 1A and FIG. 1B in accordance with embodiments of the disclosure.

FIG. 2 illustrates a chart 200 showing operations of the system 100 of FIG. 1A and FIG. 1B in accordance with embodiments of the disclosure. As shown in chart 200, an AR request is initiated by an AR interface 104 of a mobile access terminal 102. The AR request is received by an AR service delivery platform 121 that includes a BTS 120, indexed regional data stores 123 (local cache), and lower performance or non-local data stores 138 (assuming some data does not fit within the regional data stores 123). Upon receipt of the AR request, the AR service delivery platform 121 operates to build AR content corresponding to the AR request. As shown, the AR service delivery platform 121 preferably performs AR operations to build the AR content using the indexed regional data stores 123. If an indexed regional data store 123 is not available or is otherwise limited, the AR service delivery platform 121 performs AR operations to build the AR content using a non-regional or lower performance data store 138. Once the AR content is ready, the BTS 120 streams the AR content to the mobile access terminal 102 for playback.

In various embodiments, the AR service delivery platform 121 manages AR content delivery for many mobile access terminals 102. In such case, the AR service delivery platform 121 may vary its operations depending on the capabilities of mobile access terminals 102 and/or the amount of AR request traffic. For example, the identification component 130 may identify that the mobile access terminal 102 corresponds to a type of device that can effectively perform some or all operations to build AR content. In such case, the AR service delivery platform 121 responds to an AR request by denying AR service (the mobile access terminal 102 may still be able to generate its own AR content) or with instructions regarding which operations will be performed by the mobile access terminal 102 and which operations will be performed by the AR service delivery platform 121. The AR service delivery platform 121 then builds fractional AR content to stream to a corresponding mobile access terminal 102. Upon receipt, the mobile access terminal 102 combines the fractional AR content from the AR service delivery platform 121 with other fractional AR content prepared by the mobile access terminal 102 for playback via the AR interface 104.

As another example, the identification component 130 may identify that AR traffic exceeds a threshold. In such case, the AR service delivery platform 121 responds to an AR request by denying AR service (the mobile access terminal 102 may still be able to generate its own AR content) or with instructions regarding which operations will be performed by the mobile access terminal 102 and which operations will be performed by the AR service delivery platform 121. In some embodiments, the AR service delivery platform 121 may deny AR service to those mobile access terminals 102 that are capable of generating their own AR content. For example, the AR service delivery platform 121 may store a list or table of mobile access terminal types and their capabilities (e.g., processor, memory, operating system, or other capabilities) for use with determining the AR operations that can be performed by different mobile access terminals 102. Additionally or alternatively, the AR service delivery platform 121 may deny AR service according to a predetermined customer-tier scheme (device or subscription-based service). The customer-tier scheme may correspond to a multi-tier service based on one-time or repeating subscription fees. Additionally or alternatively, the customer-tier scheme may be based on a class or type of device corresponding to different mobile access terminals 102. For example, certain smartphones may receive the highest tier of AR service provided by the AR service delivery platform 121, while other smartphones receive a lower tier of AR service provided by the AR service delivery platform 121

In response to heavy AR traffic conditions, the AR service delivery platform 121 is able to build fractional AR content to stream to corresponding mobile access terminals 102. Upon receipt, the mobile access terminal 102 combines the fractional AR content from the AR service delivery platform 121 with other fractional AR content prepared by the mobile access terminal 102 for playback via the AR interface 104.

Alternatively, the AR service delivery platform 121 may be configured to perform all AR operations to build AR content, but exceeds the predefined AR latency threshold for some or all mobile access terminals 102. In such case, the quality (latency) of AR service may be based on a predetermined customer-tier scheme (device or subscription-based service).

Figure 3:
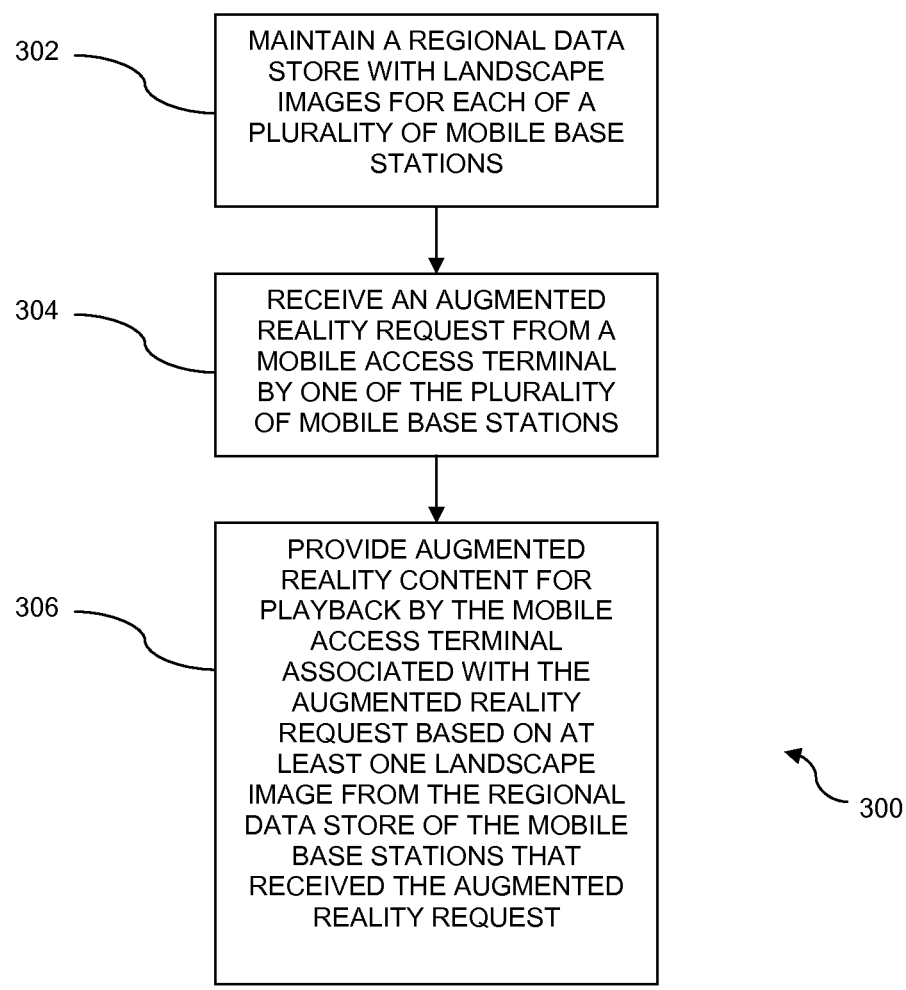
FIG. 3 illustrates a method in accordance with embodiments of the disclosure.

FIG. 3 illustrates a method 300 in accordance with embodiments of the disclosure. The method 300 may be performed by AR service delivery platform components such as those disclosed herein. As shown, the method 300 comprises maintaining a regional data store 123 with landscape images for each of a plurality of base stations 120 (block 302). At block 304, an AR request for a mobile access terminal 102 is received by a nearest one of the plurality of base stations 120. At block 306, AR content is provided for playback by the mobile access terminal 102 associated with the AR request based on at least one landscape image from the regional data store 123 of the nearest base station 120.

In at least some embodiments, the method 300 may comprise additional steps. For example, the method 300 may further comprise gathering multiple versions of at least one landscape image over time for each regional data store 123, where the multiple versions of the at least one landscape image are associated with seasonal variations for the at least one landscape image. Additionally, the method 300 may comprise gathering multiple versions of at least one landscape image over time for each regional data store 123, where the multiple versions of the at least one landscape image are associated with perspective variations for the at least one landscape image. Additionally, the method 300 may comprise updating the landscape images for each regional data store 123 based on crowd-sourced data gathered as previously described herein and eliminating redundant landscape images for each regional data store 123.

In some embodiments, the method 300 may comprise steps related to indexed landscape images as described herein. For example, the method 300 may comprise mapping a geography-based index of landscape images for each regional data store 123 to augmented reality operations to expedite building augmented reality content corresponding to the augmented reality request. The method 300 may further comprise mapping a time-based index of landscape images for each regional data store 123 to augmented reality operations to expedite building augmented reality content corresponding to the augmented reality request. The method 300 may further comprise mapping a geography-based index of landscape images for each regional data store 123 to augmented reality operations to expedite building augmented reality content corresponding to the augmented reality request. The method 300 may further comprise mapping a perspective-based index of landscape images for each regional data store 123 to augmented reality operations to expedite building augmented reality content corresponding to the augmented reality request. In some embodiments, the method 300 may further comprise extracting at least one of location information, compass information, and accelerometer information from the augmented reality request and using the extracted information to access an indexed landscape image and augmented reality content in the regional data store 123 of the base station 120 that received the augmented reality request to provide augmented reality content corresponding to the augmented reality request.

In some embodiments, the receiving step, the identifying step, the mapping step, the executing step, and the streaming step of method 300 are performed in accordance with a predefined AR latency threshold. The predefined AR latency threshold may be determined based on experiments or estimates to determine a suitable latency that does not negatively affect the interaction of a user with AR content. Without limitation to other embodiments, the predefined AR latency threshold may be between 0.1-0.5 seconds (i.e., 2 to 10 AR content frames per second). In another embodiment, the predefined AR latency threshold may be between about 0.5 second to about 5 seconds. In another embodiment, the predefined AR latency threshold may be between about 5 seconds and about 1 minute. In some embodiments, the predefined AR latency threshold varies for different quality of service (QoS) tiers applied to different devices, different user accounts, or different groups (premium tier, business tier, or economy tier). As an example, the predefined augmented reality latency threshold may be set based on high-performance hardware for interlacing images with augmented reality content. Additionally or alternatively, the predefined augmented reality latency threshold may be set based on a synchronization protocol to align the augmented reality request with the streamed augmented reality content. Additionally or alternatively, the predefined augmented reality latency threshold may be set based on a local caching scheme for images used to determine the context of the augmented reality request.

In various embodiments, the AR service delivery platform 121 manages AR content delivery for many mobile access terminals 102. In such case, the method 300 may deny AR service or vary its operations depending on the capabilities of mobile access terminals 102 and/or the amount of AR request traffic. For example, the identifying step may identify that the mobile access terminal 102 corresponds to a type of mobile access terminal 102 that can effectively perform some or all operations to build AR content. In such case, the method 300 may respond to an AR request by denying AR service (the mobile access terminal 102 may still be able to generate its own AR content) or with instructions regarding which operations will be performed by the mobile access terminal 102 and which operations will be performed by the AR service delivery platform 121. The AR service delivery platform 121 then builds fractional AR content to stream to a corresponding mobile access terminal 102. Upon receipt, the mobile access terminal 102 combines the fractional AR content from the AR service delivery platform 121 with other fractional AR content prepared by the mobile access terminal 102 for playback via the AR interface 104. In some embodiments, the AR service delivery platform 121 may deny AR service according to a predetermined customer-tier scheme (device or subscription-based service) as described herein. Alternatively, in response to heavy AR request traffic, the AR service delivery platform 121 may be configured to perform all AR operations to build AR content, but exceeds the predefined AR latency threshold for some or all mobile access terminals 102. In such case, the quality (latency) of AR service may be based on a predetermined customer-tier scheme (device or subscription-based service) as previously described herein.

Figure 4:
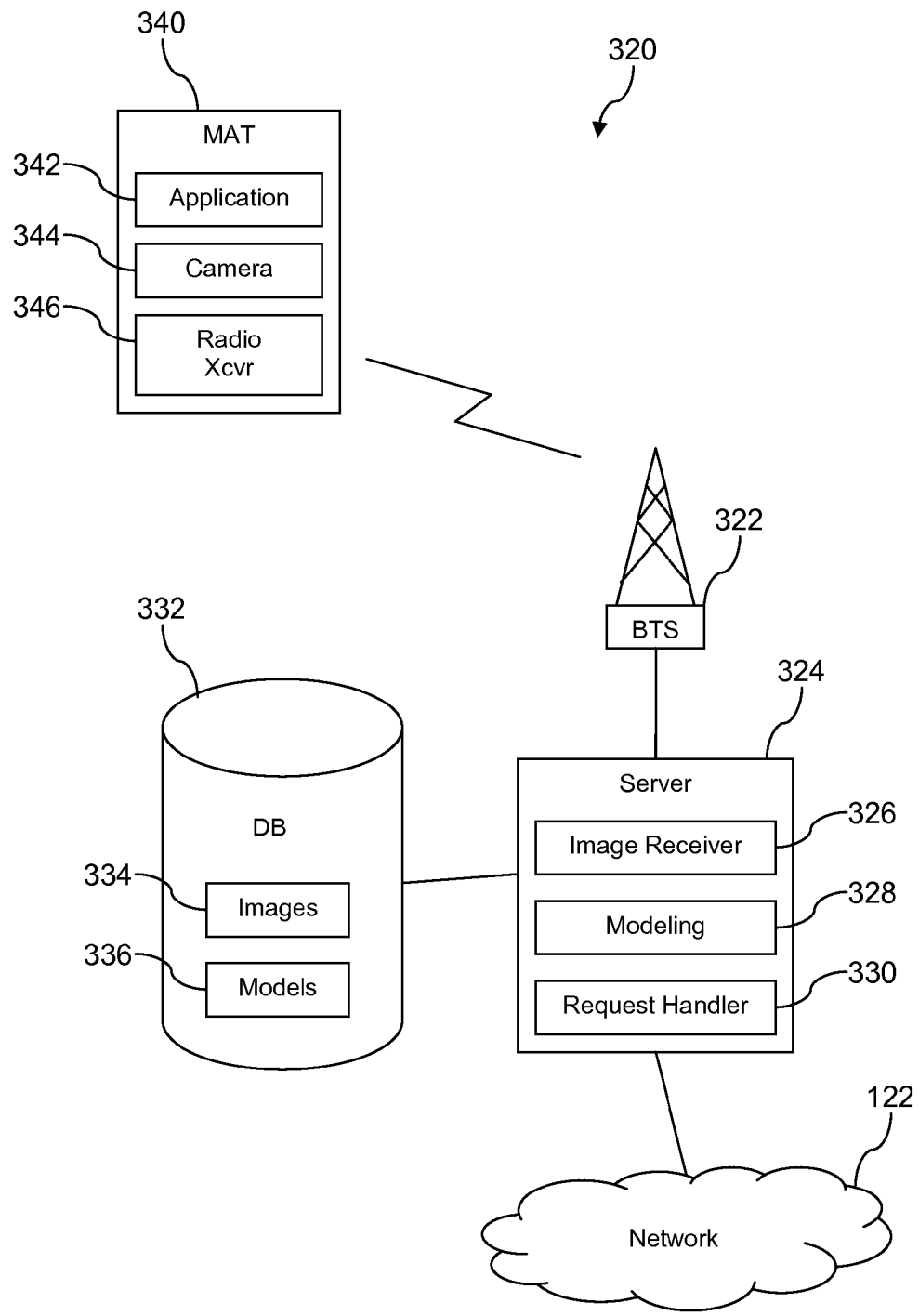
FIG. 4 is an illustration of a system according to an embodiment of the disclosure.

Turning now to FIG. 4, a system 320 is described. In an embodiment, system 320 comprises a mobile access terminal 340 a base transceiver station 322, a server computer 324, a data store 332, and the network 122. Some of the features of the system 320 are similar to those of system 100 described above, but the differences are better explained by employing a separate drawing and separate description. The server 324 is closely coupled to and co-located with the base transceiver station 322, for example at the foot of a tower, proximate to an equipment cabinet of the base transceiver station 322 or sharing the same equipment cabinet housing the electronics of at least some of the base transceiver station 322. The data store 332 is closely coupled to the server computer 324, is co-located with the server computer 324, and may share the same equipment cabinet housing as the server computer 324. While a single mobile access terminal is shown in FIG. 4, it is understood that more mobile access terminals 340 may be present in the system 320 at one time or another time.

The data store 332 comprises a plurality of images 334 and models 336. The images may be provided to the data store by mobile access terminals, for example the mobile access terminal 340 may take a picture with a camera 344 of the mobile access terminal 340 and send the picture to the base transceiver station 322 via a radio transceiver 346 of the mobile access terminal 340. The mobile access terminal 340 may send the picture in a MMS message to the network 122 to be delivered to a family member or to a colleague. The base transceiver station 322 may detect the presence of the picture and send a copy to the server 324, for example pursuant to an agreement by a user of the mobile access terminal 340 to willingly share pictures in a crowd sharing agreement.

The server computer 324 may comprise and execute an image receiver application 326, a modeling application 328, and a request handler application 330. The image receiver application 326 may receive the picture from the base transceiver station 322, process the picture into a desired image format, and write the image to the images 334 of the data store 332. The modeling application 328 may process the images 334 to identify sub-sets of images that are associated with a common entity, for example a common landscape feature, a common object such as a tree, or a common object such as a flower, and create a model of the entity based on the sub-set of images. The modeling application 328 maintains one or more models of objects, for example landscape features or other objects. When the new image is stored into the images 334 portion of the data store 332, the modeling application 328 may revise or refine the object model associated with the sub-set of images that the new image is incorporated into. In an embodiment, the server computer 324, for example the modeling application 328 or the image receiver 326, may delete some of the images based on an aging-out strategy or based on the image being represented in part in an object model stored in the models 336 portion of the data store 332.

The mobile access terminal 340 may execute an application 342 that promotes the user of the mobile access terminal 340 sending a picture to the server computer 324 to obtain information about the picture. For example, the user may request via the application 342 that an identity of an object shown in the picture be identified. The request handler 330 may attempt to match the picture to one of the models stored in the models 336 portion of the data store 332. When a match is found, information linked to or associated with the subject matching model may be searched to satisfy the request from the mobile access terminal 340 and/or the application 342. The information may be an identity of the object, for example "The Grand Teton Mountain," and this text may be displayed by the mobile access terminal 340 superimposed over the picture concurrently displayed by the mobile access terminal 340. Alternatively, the mobile access terminal 340 may pronounce the name "The Grand Teton Mountain," for example via a speaker of the mobile access terminal 340.

The user may request to see an image of the object that is pictured, for example a landscape feature, shown under different conditions than those seen in the picture the user provides in his or her request, for example at a different time of day, a different season of the year, from a different viewing perspective either closer or farther away or from a different angle or during different weather conditions. The request handler 330 may match the picture sent with the request to an object model, execute a process of extracting a suitable image from the object model based on the request, and send the image back to the mobile access terminal 340 for presentation on a display of the mobile access terminal 340.

The system 320 may be embodied at a plurality of base transceiver stations in the network of a wireless service provider. For example, a wireless service provider may operate more than 50,000 base transceiver stations across the United States, and a substantial number of these 50,000 base transceiver stations may be provided with the server computer 324 and the data store 332 as described with reference to FIG. 4 above. While it is contemplated that a majority of the modeling and request handling operations will be performed at the server computer 324 that is co-located with the base transceiver station 322, some of this processing may be performed centrally or some of the image data may be shared with a central image repository or a regional image repository. For example, in some regions dominated by an important regional landscape feature such as the Grand Canyon, the Grand Teton Mountain, the Niagra Falls, regional or central processing of images may provide some advantages. In an embodiment, in some regions the processing of images and requests may be shared between the local base transceiver station 322 and regional or centralized processing resources.

Figure 5:
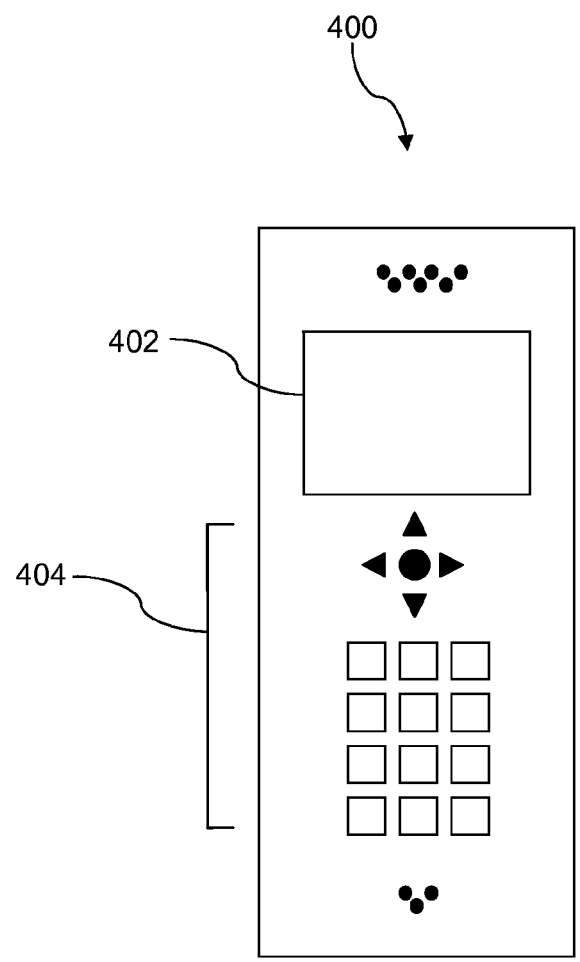
FIG. 5 illustrates a mobile access terminal in accordance with embodiments of the disclosure.

FIG. 5 illustrates a mobile access terminal 400 in accordance with embodiments of the disclosure. The mobile access terminal 400 of FIG. 5 is operable for implementing aspects of the present disclosure such as the features and operations of mobile access terminal 102, but the present disclosure should not be limited to these implementations. The mobile access terminal 400 may take various forms including a wireless handset, a pager, a personal digital assistant (PDA), a gaming device, or a media player. The mobile access terminal 400 includes a display 402 and a touch-sensitive surface and/or keys 404 for input by a user. The mobile access terminal 400 may present options for the user to select, controls for the user to actuate, and/or cursors or other indicators for the user to direct. The mobile access terminal 400 may further accept data entry from the user, including numbers to dial or various parameter values for configuring the operation of the handset. The mobile access terminal 400 may further execute one or more software or firmware applications in response to user commands. These applications may configure the mobile access terminal 400 to perform various customized functions in response to user interaction. Additionally, the mobile access terminal 400 may be programmed and/or configured over-the-air, for example from a wireless base station, a wireless access point, or a peer mobile access terminal 400. The mobile access terminal 400 may execute a web browser application which enables the display 402 to show a web page. The web page may be obtained via wireless communications with a base transceiver station, a wireless network access node, a peer mobile access terminal 400 or any other wireless communication network or system.

Figure 6:
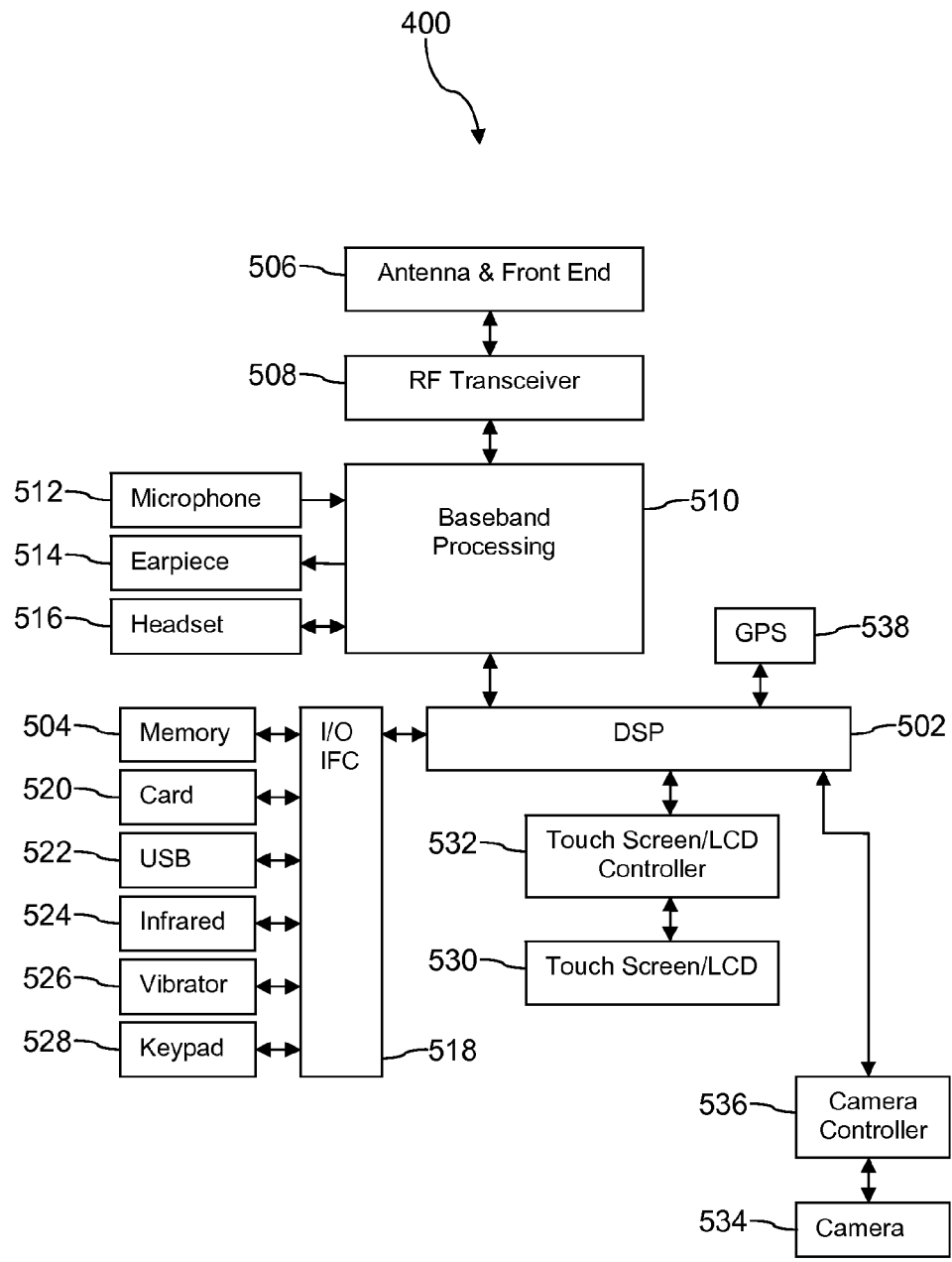
FIG. 6 shows a block diagram of the mobile access terminal of FIG. 4 in accordance with embodiments of the disclosure.

FIG. 6 shows a block diagram of the mobile access terminal 400. While a variety of known components of handsets are depicted, in an embodiment a subset of the listed components and/or additional components not listed may be included in the mobile device 400. The mobile access terminal 400 includes a digital signal processor (DSP) 502 and a memory 504. As shown, the mobile access terminal 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile access terminal 400 may include another kind of display that does not provide a touch sensitive screen. In an embodiment, the DSP 502 may communicate directly with the memory 504 without passing through the input/output interface 518. Additionally, in an embodiment, the mobile access terminal 400 may comprise other peripheral devices that provide other functionality.

The DSP 502 or some other form of controller or central processing unit operates to control the various components of the mobile access terminal 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile access terminal 400 to function as a peripheral device to exchange information with a personal computer or other computer system. The infrared port 524 and other optional ports such as a Bluetooth® interface or an IEEE 802.11 compliant wireless interface may enable the mobile access terminal 400 to communicate wirelessly with other nearby handsets and/or wireless base stations.

The keypad 528 couples to the DSP 502 via the interface 518 to provide one mechanism for the user to make selections, enter information, and otherwise provide input to the mobile access terminal 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile access terminal 400 to determine its position.

Figure 7A:
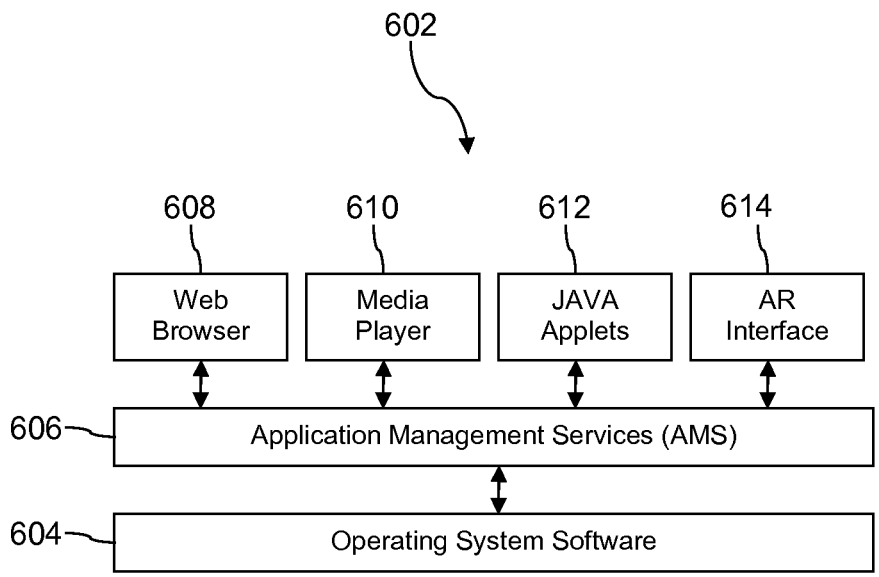
FIGS. 7A and 7B illustrate software environments that may be implemented by a mobile access terminal in accordance with embodiments.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile access terminal 400. Also shown in FIG. 7A are a web browser application 608, a media player application 610, JAVA applets 612, and AR interface 614 (corresponding to AR interface 104). The web browser application 608 may be executed by the mobile access terminal 400 to browse content and/or the Internet, for example when the mobile access terminal 400 is coupled to a network via a wireless link. The web browser application 608 may permit a user to enter information into forms and select links to retrieve and view web pages. The media player application 610 may be executed by the mobile access terminal 400 to play audio or audiovisual media. The JAVA applets 612 may be executed by the mobile access terminal 400 to provide a variety of functionality including games, utilities, and other functionality. The AR interface 614 may be executed by the mobile access terminal 400 to initiate AR requests and to playback AR content. The AR content is provided by an AR service delivery platform as described herein. Alternatively, some AR content or fractional AR content may be provided by the mobile access terminal 400 as described herein.

Figure 7B:
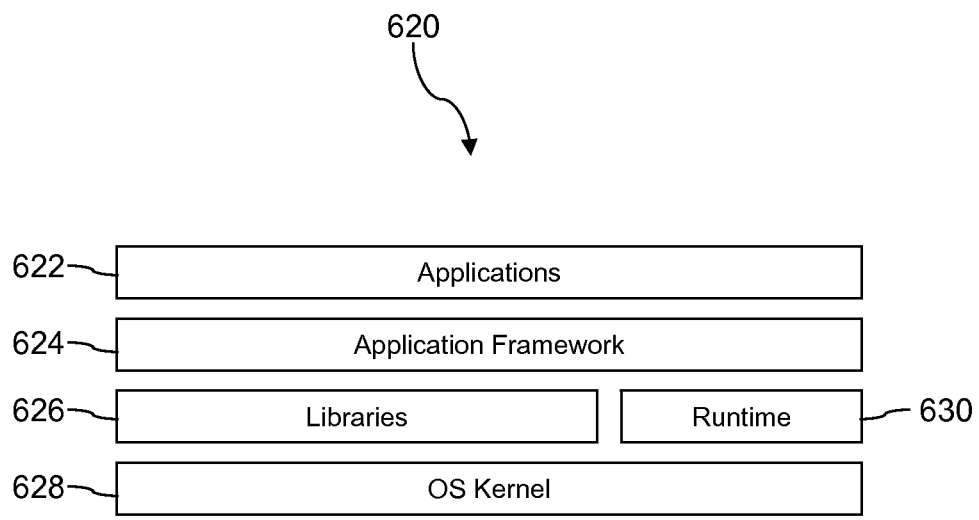

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
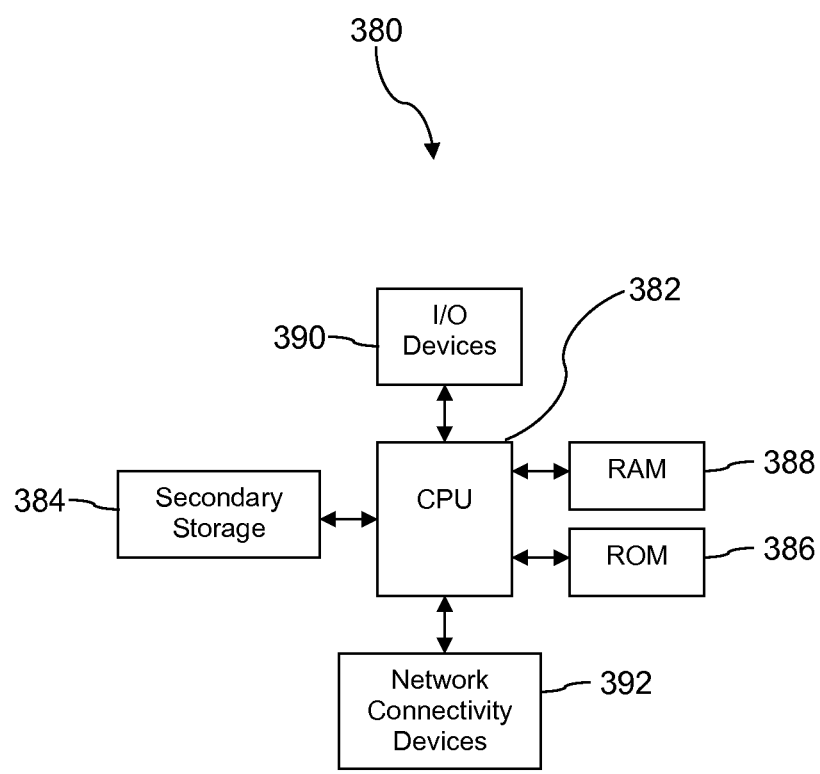
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

In at least some embodiments, the computer system 380 corresponds to an base station having a processor (e.g., processor 382) and a data store storing landscape images for a coverage area of the base station. The base stations also comprises a non-transitory computer-readable medium in communication with the processor and storing augmented reality servicing instructions that, when executed, cause the processor to receive an augmented reality request from a mobile access terminal. The augmented reality servicing instructions, when executed, may further cause the processor to identify one of the landscape images in the database corresponding to the augmented reality request. The augmented reality servicing instructions, when executed, may further cause the processor to stream augmented reality content corresponding to the augmented reality request based on the identified landscape image.

In some embodiments, the augmented reality servicing instructions, when executed, may further cause the processor to identify a season and perspective for the augmented reality request and to identify one of the landscape images based on the identified season and perspective. The augmented reality servicing instructions, when executed, may further cause the processor to index crowd-sourced updates to the landscape images and to eliminate redundant images. The augmented reality servicing instructions, when executed, may further cause the processor to extract at least one of location information, compass information, and accelerometer information from the augmented reality request and to use the extracted information to access an indexed landscape image in the regional data store to prepare the augmented reality content corresponding to the augmented reality request.

In some embodiments, augment reality servicing instructions, when executed, may further cause the processor to respond to an augmented reality request with a service denial response or with fractional augmented reality content upon identifying that the mobile access terminal is a type of mobile access terminal that is capable of generating the augmented reality content within a predefined augmented reality latency threshold. Additionally, the AR service delivery platform instructions, when executed, further cause the processor to respond to an augmented reality request with a service denial response or with fractional augmented reality content upon identifying a heavy augmented reality request traffic condition. Additionally, the AR service delivery platform instructions, when executed, further cause the processor to respond to an augmented reality request with a augmented reality content that does not comply with a predefined AR latency threshold when a heavy augmented reality request traffic condition exists. In some embodiments, certain mobile access terminals may receive AR service during heavy AR request traffic conditions while other are denied AR service based on a subscription plan or other criteria.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of accessing landscape images comprising:
    maintaining a plurality of regional data stores of landscape models for each of a plurality of base stations, wherein each of the plurality of base stations is associated with one of the plurality of regional data stores, and wherein each regional data store is co-located with its corresponding base station and only maintains landscape models associated with landscapes located proximate to its corresponding base station;
    analyzing, by a base station of the plurality of base stations, a plurality of landscape images to identify a sub-set of the plurality of landscape images that are associated with a same landscape located proximate to the base station, wherein the subset of the plurality of landscape images are associated with at least one of seasonal variations or time of day variations for the same landscape, and wherein the plurality of landscape images are provided to the base station by a plurality of mobile access terminals that took the plurality of landscape images of one or more landscapes located proximate to the base station while in a coverage area of the base station;
    developing, by the base station, a landscape model for the same landscape based on the analyzing;
    receiving, by the base station, a request for a landscape image of the plurality of landscape images from a mobile access terminal in a serving area of the base station, wherein the request for the landscape image identifies the landscape model maintained in the regional data store of the base station;
    identifying, by the base station, the landscape image in the regional data store of the base station corresponding to the request; and
    transmitting, by the base station, the landscape image to the mobile access terminal, wherein the landscape image is created based on the landscape model identified in the request.

2. The method of claim 1, further comprising gathering multiple images of a landscape over time for each regional data store, wherein the multiple images of the landscape are associated with variations of perspective of the landscape.

3. The method of claim 1, further comprising:
    updating at least one landscape model of one of the regional data stores based on crowd-sourced images of at least one landscape associated with the at least one landscape model; and
    eliminating redundant images of at least one landscape for at least one of the regional data stores.

4. The method of claim 1, further comprising mapping a geography-based index of images of at least one landscape for at least one of the regional data stores to augmented reality operations to expedite building augmented reality content corresponding to an augmented reality request.

5. The method of claim 1, further comprising mapping a perspective-based index of images of at least one landscape for at least one of the regional data stores to augmented reality operations to expedite building augmented reality content corresponding to an augmented reality request.

6. The method of claim 1, further comprising mapping a time-based index of images of at least one landscape for at least one of the regional data stores to augmented reality operations to expedite building augmented reality content corresponding to an augmented reality request.

7. The method of claim 1, further comprising:
  extracting at least one of location information, compass information, or accelerometer information from the request for the landscape image; and
  accessing an indexed landscape image and augmented reality content in the regional data store of the base station based on the extracted information to provide augmented reality content corresponding to the augmented reality request.

8. A system for accessing landscape images comprising:
  a plurality of base stations; and
  a plurality of regional data stores that each comprise a plurality of landscape models, wherein each of the plurality of base stations is associated with one of the plurality of regional data stores, and wherein each regional data store is co-located with its corresponding base station and only maintains landscape models associated with landscapes located proximate to its corresponding base station,
  wherein a base station of the plurality of base stations, which is nearest to a mobile access terminal, is configured to:
    analyze a plurality of landscape images to identify a sub-set of the plurality of landscape images that are associated with a same landscape located proximate to the base station, wherein the subset of the plurality of landscape images are associated with at least one of seasonal variations or time of day variations for the same landscape, and wherein the plurality of landscape images are provided to the base station by a plurality of mobile access terminals that took the plurality of landscape images of one or more landscapes located proximate to the base station while in a coverage area of the base station,
    develop a landscape model for the same landscape based on the analysis,
    receive an augmented reality request for the mobile access terminal,
    identify the landscape model of the plurality of landscape models,
    identify at least one of the sub-set of the plurality of landscape images associated with the landscape model in the regional data store of the base station corresponding to the augmented reality request, and
    stream augmented reality content corresponding to the augmented reality request based on the identified at least one of the sub-set of the plurality of landscape images in the regional data store of the base station.

9. The system of claim 8, wherein at least one of the regional data stores comprises different versions of at least some of the plurality of landscape images, where the different versions are associated with different seasons throughout a year.

10. The system of claim 8, wherein at least one of the regional data stores comprises different versions of at least some of the plurality of landscape images, where the different versions are associated with different perspective variations.

11. The system of claim 8, wherein at least one of the regional data stores receives updates to its plurality of landscape images based on crowd-sourced data.

12. The system of claim 8, wherein at least one of the regional data stores comprises an indexing control scheme for its plurality of landscape images to expedite building the augmented reality content corresponding to the augmented reality request.

13. The system of claim 8, wherein the augmented reality request comprises geographic location information, and wherein the geographic location information is used to access an indexed landscape image stored by the base station to build the augmented reality content corresponding to the augmented reality request.

14. The system of claim 8, wherein the augmented reality request comprises accelerometer information, and wherein the accelerometer information is used to access an indexed landscape image stored by the base station to build the augmented reality content corresponding to the augmented reality request.

15. The system of claim 8, wherein the augmented reality request comprises time information, and wherein the time information is used to access an indexed landscape image stored by the base station to build the augmented reality content corresponding to the augmented reality request.

16. A base station (BTS), comprising:
  a processor;
  a regional data store co-located with the base station that stores a plurality of landscape models, wherein the regional data store only maintains landscape models associated with landscapes located proximate to the base station; and
  a non-transitory computer-readable medium in communication with the processor and storing augmented reality servicing instructions that, when executed, cause the processor to:
    analyze a plurality of landscape images to identify a sub-set of a plurality of landscape images that are associated with a same landscape located proximate to the base station, wherein the subset of the plurality of landscape images are associated with at least one of seasonal variations or time of day variations for the same landscape, and wherein the plurality of landscape images are provided to the base station by a plurality of mobile access terminals that took the plurality of landscape images of one or more landscapes located proximate to the base station while in a coverage area of the base station,
    develop a landscape model for the same landscape based on the analysis,
    receive an augmented reality request from a mobile access terminal,
    identify the landscape model of the plurality of landscape models,
    identify one of the sub-set of the plurality of landscape images associated with the landscape model in the regional data store corresponding to the augmented reality request, and
    stream augmented reality content corresponding to the augmented reality request based on the identified one of the subset of the plurality of landscape images.

17. The base station of claim 16, wherein the augmented reality servicing instructions, when executed, further cause the processor to identify a season and perspective for the augmented reality request and to identify the one of the subset of the plurality of landscape images based on the identified season and perspective.

18. The base station of claim 16, wherein the augmented reality servicing instructions, when executed, further cause the processor to index crowd-sourced updates to the plurality of landscape images and to eliminate redundant images.

19. The base station of claim 16, wherein the augmented reality servicing instructions, when executed, further cause the processor to extract at least one of location information, compass information, and accelerometer information from the augmented reality request and to use the extracted information to access an indexed landscape image in the regional data store to prepare the augmented reality content corresponding to the augmented reality request.

* * * * *